March 20, 1951    H. HALL    2,545,883
APPARATUS FOR SCRAPING AND CLEANING CONVEYER
BELTS, ROLLERS, AND THE LIKE
Filed June 9, 1948
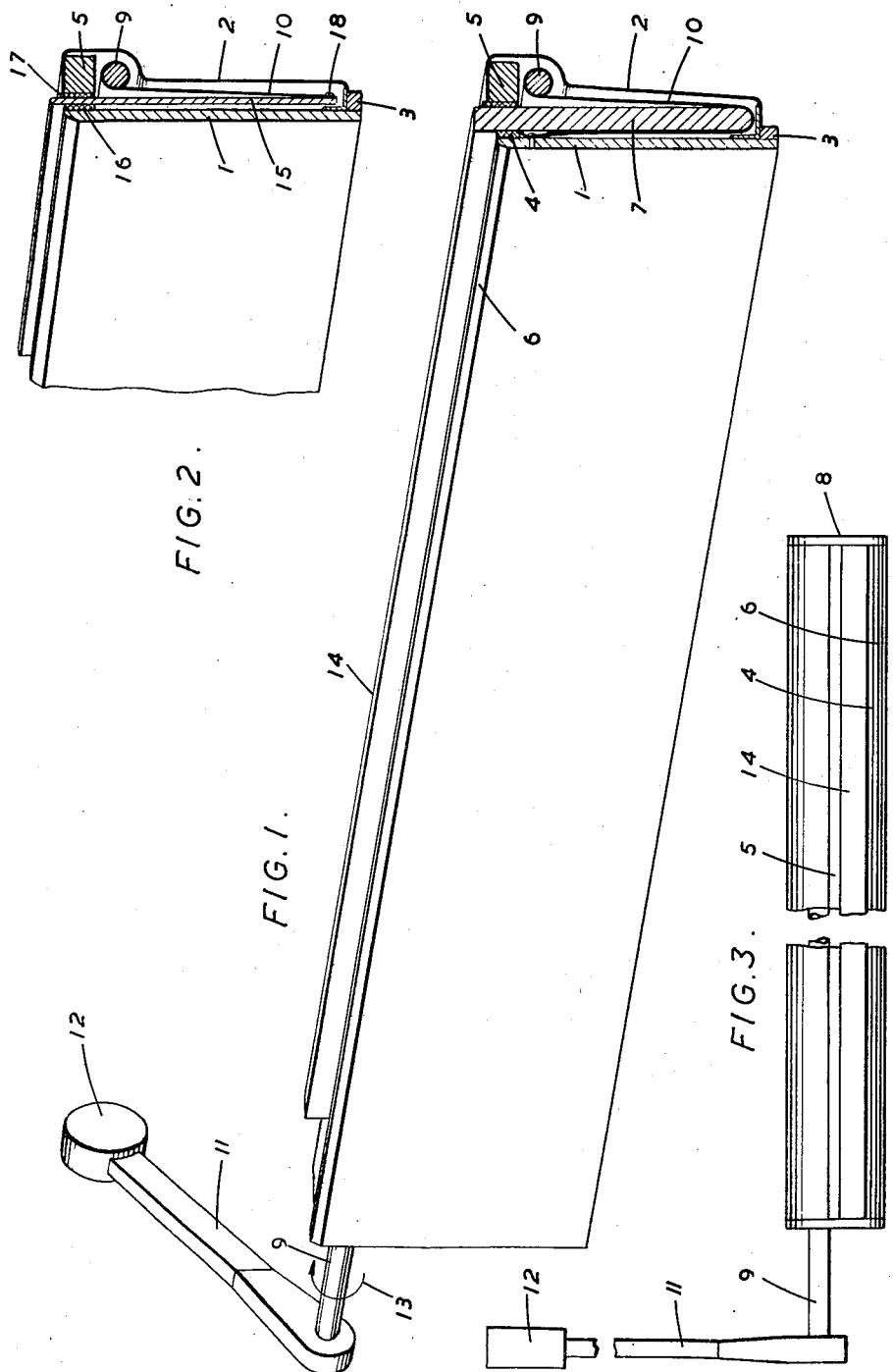
INVENTOR
HARRY HALL
By Raymond Richardson
Henry E. David
Att'ys Patented Mar. 20, 1951

UNITED STATES PATENT OFFICE 2,545,883

APPARATUS FOR SCRAPING AND CLEANING CONVEYER BELTS, ROLLERS, AND THE LIKE

Harry Hall, Erith, England

Application June 9, 1948, Serial No. 31,924
In Great Britain June 18, 1947

8 Claims. (Cl. 198—229)

1

This invention relates to apparatus for scraping and cleaning conveyor belts, rollers and the like hereinafter referred to as a conveyor. It is usual when conveying materials such as coal, ores, ballast and the like for a quantity of the material to remain on the conveyor belt after the bulk has been discharged at the discharge point as a result the remaining material drops from the belt at all points along its return path. This is generally undesirable as it is preferred that the remaining material should be removed at one point.

The principal object of the present invention is to provide a simple and compact form of apparatus which will remove the remaining material from the conveyor belt. A further object of the invention is to provide means for maintaining the scraper in continuous contact with the belt so that despite wear on the scraper it will remain in its operative position over comparatively long periods without requiring replacement at frequent intervals.

Accordingly the present invention includes apparatus for use in removing material from a conveyor, roller or the like, comprising a scraper element supported between front and rear members by a flexible strap from the side opposite to the scraping face, the other end passing around a shaft extending lengthwise of the scraper and means on said shaft to maintain said scraper element in contact with said conveyor belt.

The scraper may be constructed from rubber sheet or from steel strip mounted between the front and rear members a water-tight seal being provided between the said members and said scraper, the ends between the members being closed by vertical elements.

According to a further feature of the invention the shaft extends across the scraper element behind the rear member and is connected to the scraper element by means of straps spaced throughout the length thereof, one end of each of said straps being secured to the scraper element or to the front member and the other end to said shaft, said shaft, scraper and straps being housed in a water-tight casing.

The shaft extends outwardly of the casing and has secured thereto a ratchet lever having a tension weight thereon. In this manner the straps secured to the shaft are wound thereon by movement of the lever thereby forcing the scraper element outwardly of the casing and maintaining it in contact with the conveyor belt.

In order that the invention may be more easily understood and readily put into practice a convenient embodiment thereof will hereinafter be described with reference to the accompanying drawing, in which—

Figure 1 shows a perspective view of one form of the invention having a rubber scraper,

2

Figure 2 shows a modification of the invention having a steel scraper and

Figure 3 shows a plan view of Figure 1.

Referring to Figures 1 and 2, the device comprises a front cover plate 1 and a rear cover plate 2 provided with seals 3 and 4 by which the space between the cover plates is rendered water-tight.

Mounted towards the upper end of the cover plate 2 is a support bar 5. This support bar is spaced from the front cover plate to leave a slot 6 through which a rubber scraper 7 projects, the scraper extending downwardly into the space between the cover plates. The ends of the slot 6 are closed by end members 8 so that in effect the rubber scraper 7 is held in a box-like container the upper end of which is open and through which the scraper extends. The seals 4 contact one side of the scraper and the scraper contacts the support bar 5 to form a water-tight seal.

Also mounted under the cover plate 2 is a shaft 9 which extends throughout the length of the device and through an opening at one end thereof outwardly of the casing. Mounted with one end secured to the shaft 9 are a plurality of tension straps 10, the other ends of which are secured to the front cover plate 1, the said straps extending down one side of the scraper and up the opposite side where they are secured near the top of the front cover plate 1.

To the end of the shaft 9 which extends outwardly of the casing there is mounted a ratchet lever 11 having a tension weight 12 at the other end thereof or the equivalent, for example a spring or pulley and weight. The tension weight tends to rotate the shaft in the direction of the arrow 13 so that in turning the straps 10 will be wound onto the shaft at the same time tending to move the scraper 7 outwardly of the casing.

As the upper edge 14 of the scraper contacts the conveyor belt it will remove any adhering material thereon and as the scraper wears it will be maintained in contact with the conveyor belt due to the fact that the weighted lever 11 is continuously forcing the scraper against the conveyor belt.

In the modification of the invention shown in Figure 3, the rubber scraper 7 is replaced by a steel strip 15 and the upper end of the casing is made watertight by means of rubber seals 16, 17 mounted on the front cover plate 1 and the support bar 5, the steel strip extending outwardly of the casing through these rubber seals.

In this case the tension straps are secured to the lower end of the steel strip by means of screws or studs 18.

The device may be used in duplicate that is to say two scrapers may be provided, one constructed with a rubber scraper and the other with a steel scraper, the former being mounted in front of the latter so that the rubber scraper will remove dry material effectively from the conveyor belt and the steel scraper will remove wet material. This arrangement is eminently suitable for conveyors working in the open and subject to climatic conditions.

It will be understood that the scraper may be positioned at any convenient point along the conveyor belt and will effectively remove any material adhering thereto at one point.

Preferably the scraper is constructed from material such as a hard-wearing and abrasion-resisting rubber compound but it will be understood that any other suitable material may be used provided it is not so hard as to be harmful to the conveyor belt.

Although the invention has been described with reference to a scraper for removing material adhering to a conveyor belt it will be understood that the device may be used as a plough. In this case the scraping apparatus is arranged at a suitable angle to the direction of movement of the belt to cause the materials to be discharged sidewardly therefrom.

I claim:

1. Apparatus for use in removing material from a conveyor belt, comprising in combination a scraper element, front and rear members between which said element projects a flexible strap for supporting said element from the side opposite to the scraping face, a shaft extending lengthwise of said scraper around which one end of said strap is passed and secured thereto and means on said shaft to maintain said scraper element in contact with said conveyor belt.

2. Apparatus for use in removing material from a conveyor belt, comprising in combination, a rubber strip forming a scraper element, front and rear members between which said element projects, water-tight sealing means between said front and rear members, vertical elements for closing the space between the ends of said members, a flexible strap for supporting said rubber strip secured at one end to said front member, a shaft extending lengthwise of said scraper around which the other end of said strap is passed and means on said shaft to maintain said scraper element in contact with said conveyor belt.

3. Apparatus for removing material from a conveyor belt comprising in combination, a scraper element, front and rear members between which said element projects, a flexible strap for supporting said element from the side opposite to the scraping face, a shaft extending lengthwise of said scraper element behind said rear member around which shaft one end of said strap is passed and secured thereto, said strap passing round the side of the scraper element opposite to the scraping face, a water-tight casing in which said shaft, scraper element and strap are housed, and means on said shaft to maintain said scraper element in contact with said conveyor belt.

4. Apparatus for removing material from a conveyor belt, comprising in combination, a scraper element, front and rear members between which said element projects, flexible straps for supporting said element, from the side opposite to the scraping face, a shaft extending lengthwise of said scraper element behind said rear member around which shaft the other ends of said straps are passed and secured, a water-tight casing in which said shaft, scraper element and straps are housed, said shaft extending outwardly of said casing, a ratchet lever secured to said shaft, a tension weight on said lever whereby said straps are wound on said shaft by movement of said casing and maintaining said scraper in contact with the conveyor belt.

5. Apparatus for use in removing material from a conveyor belt, comprising in combination a steel strip scraper element, front and rear members between which said scraper element projects, a flexible strap for supporting said scraper element from the side opposite to the scraping face, a shaft extending lengthwise of said scraper element round which the other end of said strap is passed and secured and means on said shaft to maintain said steel strip in contact with said conveyor belt.

6. Apparatus for use in removing material from a conveyor belt, comprising in combination a steel strip scraper element, front and rear members between which said scraper element projects, water-tight sealing means between said front and rear members, vertical elements for closing the space between the ends of said members, a flexible strap for supporting said scraper element from the side opposite to the scraping face, a shaft extending lengthwise of said scraper element round which the other end of said strap is passed and secured and means on said shaft to maintain said scraper element in contact with said conveyor belt.

7. Apparatus for removing material from a conveyor belt comprising in combination, a steel strip scraper element, front and rear members between which said scraper element projects, flexible straps for supporting said scraper element from the side opposite to the scraping face, a shaft extending lengthwise of said scraper element behind said rear member around which shaft the other ends of said straps are passed and secured, a water-tight casing in which said shaft, steel strip scraper element and straps are housed, and means on said shaft to maintain said steel strip scraper element in contact with said conveyor belt.

8. Apparatus for removing material from a conveyor belt, comprising in combination a steel strip scraper element, front and rear members between which said scraper element projects, flexible straps for supporting said scraper element from the side opposite to the scraping face and secured to said scraper element, a shaft extending lengthwise of said scraper element behind said rear member around which shaft the other ends of said straps are passed and secured, a water-tight casing in which said shaft, steel strip scraper element and straps are housed, said shaft extending outwardly of said casing, a ratchet lever secured to said shaft, a tension weight on said lever whereby said straps are wound on said shaft by movement of said lever thereby forcing said steel strip scraper element outwardly of said casing and maintaining it in contact with the conveyor belt.

HARRY HALL.

REFERENCES CITED

The following references are of record in the file of this patent:

UNITED STATES PATENTS

| Number | Name | Date |
| --- | --- | --- |
| 835,526 | Horn | Nov. 13, 1906 |
| 877,141 | Thompson | Jan. 21, 1908 |
| 2,177,032 | Lodding | May 10, 1938 |